United States Patent
Kennedy, III

(10) Patent No.: US 7,070,518 B2
(45) Date of Patent: *Jul. 4, 2006

(54) GOLF BALL WITH TEMPERATURE INDICATOR

(75) Inventor: Thomas J. Kennedy, III, Wilbraham, MA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/774,132

(22) Filed: Feb. 6, 2004

(65) Prior Publication Data

US 2005/0014578 A1 Jan. 20, 2005

Related U.S. Application Data

(63) Continuation-in-part of application No. 10/006,507, filed on Dec. 6, 2001, now Pat. No. 6,780,127.

(51) Int. Cl.
*A63B 37/12* (2006.01)

(52) U.S. Cl. .................................................... 473/378
(58) Field of Classification Search ................ 473/378
See application file for complete search history.

(56) References Cited

U.S. PATENT DOCUMENTS

| | | | | |
|---|---|---|---|---|
| 3,980,300 | A | * | 9/1976 | Hornsby, Jr. ................ 473/594 |
| 4,028,118 | A | * | 6/1977 | Nakasuji et al. ......... 106/31.19 |
| 4,679,795 | A | | 7/1987 | Melvin et al. |
| 4,717,710 | A | | 1/1988 | Shimizu et al. |
| 4,911,451 | A | | 3/1990 | Sullivan et al. |
| 5,394,824 | A | | 3/1995 | Johnson, Jr. |
| 5,503,583 | A | * | 4/1996 | Hippely et al. ................ 446/14 |
| 5,558,700 | A | * | 9/1996 | Shibahashi et al. ...... 106/31.15 |
| 5,597,361 | A | | 1/1997 | Hope |
| 5,651,741 | A | * | 7/1997 | Masutani et al. ........... 473/200 |
| 5,779,562 | A | * | 7/1998 | Melvin et al. .............. 473/373 |
| 5,805,245 | A | | 9/1998 | Davis |
| 5,823,891 | A | | 10/1998 | Winskowicz |
| 5,938,544 | A | | 8/1999 | Winskowicz |
| 6,012,992 | A | | 1/2000 | Yavitz |
| 6,585,555 | B1 | * | 7/2003 | Wong et al. ................. 446/153 |
| 6,780,127 | B1 | * | 8/2004 | Kennedy, III ............... 473/378 |

* cited by examiner

*Primary Examiner*—Raeann Gorden
(74) *Attorney, Agent, or Firm*—Michael A. Catania; Elaine H. Lo

(57) ABSTRACT

A golf ball having an integral means for sensing temperature whereby a golfer can readily determine if a golf ball is at the optimum temperature for play. For purposes of indicating temperature, the ball incorporates a thermochromic coating that will change color or become transparent or translucent at a predetermined temperature.

5 Claims, 2 Drawing Sheets

GOLF BALL WITH TEMPERATURE INDICATOR

CROSS REFERENCE TO RELATED APPLICATIONS

This application is a continuation-in-part of U.S. application Ser. No. 10/006,507, filed Dec. 6, 2001 now U.S. Pat. No. 6,780,127.

FIELD OF THE INVENTION

The present invention relates to golf balls having integral temperature sensors or systems. The temperature sensor or system comprises a stamp or mark or a coating that changes color at a predetermined temperature, allowing a golfer to determine the approximate temperature of a golf ball and hence its suitability for play. Knowing the temperature of a golf ball is useful in that it allows a golfer to determine when a golf ball is capable of delivering maximum performance when struck by a golf club.

BACKGROUND OF THE INVENTION

Generally, golf balls are one of three types. A first type is a multi-piece wound ball wherein a vulcanized rubber thread is wound under tension around a solid or semi-solid core, and thereafter enclosed in a single or multi-layer covering of a tough, protective material. A second type of golf ball is a one-piece ball formed from a solid mass of a resilient material that has been cured to develop the necessary degree of hardness to provide utility. One-piece molded balls do not have a second enclosing cover. A third type of ball is a multi-piece non-wound ball that includes a liquid, gel or solid core of one or more layers and a cover having one or more layers formed over the core.

Attempts to improve and/or optimize performance characteristics in golf balls are typically directed toward achieving better feel when the ball is struck with a golf club, and also allowing for increased or optimum distance while at the same time adhering to the rules set forth by the United States Golf Association (U.S.G.A.) regarding the physical characteristics and performance properties of golf balls. These rules specify that the weight of a golf ball shall not be greater than 1.620 ounces, the diameter of the ball shall not be less than 1.680 inches and the velocity of the ball shall not be greater than 255 feet per second (250 feet per second with a 2% tolerance level). The U.S.G.A. rules also specify that the overall distance a golf ball should travel shall not cover an average distance (in carry and roll) greater then 280 yards, plus a 6% tolerance level (296.8 yards total).

Over the years, attempts to improve characteristics such as feel and durability have centered on the materials used to form the various layers of a golf ball. Improvements in spin and distance characteristics are usually directed toward the actual construction and physical makeup of the golf ball. The use of one or more intermediate layers between a core and a cover layer to achieve such improvements is known in the art. The thickness and/or material hardness of each layer may also be varied in order to achieve a desired property.

In general, there is a natural transfer of energy that occurs within a golf ball when the ball is struck by a golf club. Energy is transferred from the club face to the golf ball cover, and then subsequently transferred through each layer beneath the cover. In solid non-wound golf balls employing spherical layers, energy transfer is generally a function of the thickness and material composition of a given layer. Therefore, varying either the thickness of a given layer and/or the material from which a layer is made affects the efficiency of energy transfer occurring within a golf ball and consequently affects the overall performance characteristics of that ball.

In both the wound and solid multi-layer golf balls, covers are placed around the preformed cores by techniques such as injection molding, compression molding, casting etc. When the cover is placed on the core, dimples are formed in the outer surface of the cover. This invention is concerned with the cover and/or coatings of a golf ball.

There exists a need for a golf ball design that assists a golfer in determining the approximate temperature of a golf ball and the ball's suitability for play in a given set of weather conditions. Knowing the ball temperature allows a golfer to determine when the ball is capable of delivering maximum performance characteristics, such as spin and overall distance.

Golf balls having surfaces that incorporate dyes that change color due to an environmental change are known in the prior art. In this regard U.S. Pat. Nos. 5,938,544 and 5,823,891 to Winskowicz disclose golf balls which incorporate microencapsulated dyes in the surface thereof. These dyes change color upon prolonged exposure to water. The invention of these patents is useful for indicating when a golf ball becomes a "water ball" as a result of a prolonged immersion in water. The dyes in question change color upon immersion and remain colored; they do not revert back to their original color.

Thermochromic materials have been incorporated into the face of a golf club for purposes of indicating the point of impact between a golf ball and a golf club face. See, for example, U.S. Pat. No. 5,597,361 to Hope, and U.S. Pat. No. 5,805,245 to Davis, which discloses the use of thermochromic liquid crystals to indicate temperatures over different ranges. Similarly U.S. Pat. No. 5,394,824 to Johnson Jr. discloses the use of thermochromic dyes to indicate the point of impact of a tennis ball with a tennis court. Finally, the incorporation of thermochromic dyes into printing inks is disclosed in U.S. Pat. No. 4,717,710 to Shimizu et al.

None of the patents discussed above discloses the use of a layer of a thermochromic material on the surface of a golf ball for purposes of indicating the temperature of said golf ball, or the use of a material, such as a leuco dye, in a coating for purposes of indicating the temperature of said golf ball.

SUMMARY OF THE INVENTION

The present invention relates to new and improved golf balls that overcome the above referenced problems. In this regard, the present invention is directed to golf balls having a temperature indicating mechanism that indicates when a golf ball is at the optimum temperature for play.

In a first aspect, the present invention is directed to a golf ball comprising a core and a cover. The cover has one or more coating layers disposed on its surface, wherein at least one of the coating layers comprises a leuco dye distributed throughout the coating. The leuco dye in the coating layer(s) is capable of indicating whether the golf ball is above or below a predetermined temperature. The leuco dye may be in one or more coating layers, such as a top coat or primer layer, on the surface of the golf ball.

In another aspect, the present invention is directed to a golf ball comprising a core and a cover. The cover has one or more coating layers disposed on its surface, wherein at least one of the coating layers comprises a leuco dye distributed throughout the coating. At a predetermined temperature, the leuco dye changes the color of the coating, thus allowing the observation of the dye and indicating that the ball is suitable or not suitable for play.

BRIEF DESCRIPTION OF THE DRAWINGS

The following is a brief description of the drawings, which are presented for the purpose of illustrating the invention and not for the purposes of limiting the same.

DETAILED DESCRIPTION OF THE PREFERRED EMBODIMENT

Figure 1:
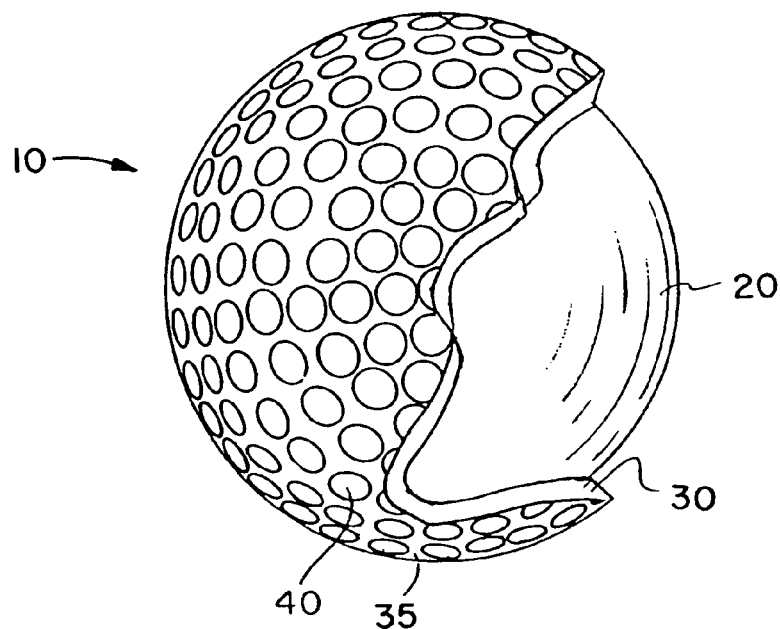
FIG. 1 is a perspective view of a golf ball having a core and a cover and a coating layer disposed on the cover.

The major components of a golf ball are generally polymeric materials. A golf ball functions as a result of its ability to transfer the kinetic energy of a moving golf club head to the golf ball. The ability to transfer this kinetic energy is related to the modulus of elasticity of the various polymeric compounds that make up the components of the golf ball. The modulus of elasticity of a polymer varies with temperature. Generally, the higher the temperature within a given range, the higher the modulus of elasticity, and conversely, the lower the temperature, the lower the modulus of elasticity. Simply stated, as the temperature drops, golf balls become stiff and hence cannot be driven as far as when they are warm.

A golfer always strives for maximum performance from a golf ball. Maximum performance is often characterized by the length of a drive, with longer being better. In order to achieve maximum performance, a golf ball must be at an optimum temperature for playing. For practical purposes, this optimum temperature is generally from about 15 to about 35° C., although individual golfers may prefer temperatures above or below this range.

Early or late in the golf season, particularly in certain climates, golf balls can be well below these optimum temperatures. This is particularly true if golf balls have been left outside, for example in the trunk of a car, or in an unheated location. It has been found that a golf ball stored outside or in an unheated area may have a ball temperature of 0° C. or less, particularly early in the day.

Golfers have long recognized that cold golf balls do not perform well. As a way of warming golf balls golfers often place golf balls inside their clothing so that body warmth might warm the golf balls. Some golfers use electric powered golf ball warmers to warm the golf balls. Regardless of which method is used, a golfer still has no way of knowing when a golf ball is at an optimum temperature for play. This invention is concerned with a golf ball that will indicate when a golf ball is at optimum temperature for play.

In one preferred embodiment of the invention, there is a golf ball comprising a core and a cover. The cover has one or more coating layers disposed on its surface, wherein at least one of the coating layers comprises a leuco dye distributed throughout the coating. The leuco dye in the coating layer(s) is capable of indicating whether the golf ball is above or below a predetermined temperature. The leuco dye may be in one or more coating layers, such as a top coat or primer layer, on the surface of the golf ball. In a preferred embodiment of the invention, the golf ball has a coating which incorporates a leuco dye in the coating in such a manner that a positive indicia is given as to whether a ball is in condition for play or not. Any type of golf ball and coating material may be used, as long as the leuco dye can be incorporated in the coating. The coating could indicate when the ball is above a predetermined temperature that would constitute an optimum condition by showing no color (therefore, remaining as a white cover), and it could change to a color, such as blue, when the golf ball is below said optimum temperature. Alternatively, the ball could have a color when it is suitable and no color when it is not. Any color and scheme may be used as long as the golfer knows which is suitable for play and which is not suitable for play.

Figure 2:
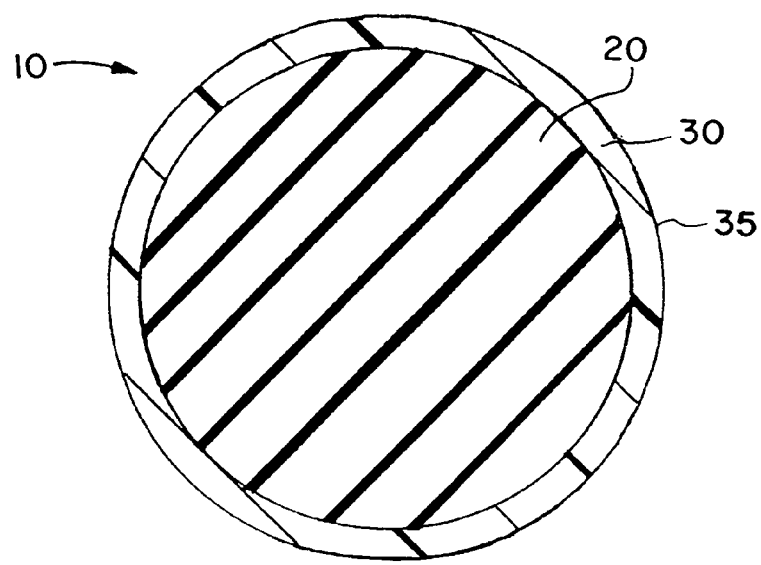
FIG. 2 is a cross section of the golf ball of FIG. 1.

Referring to FIGS. 1 and 2, it can be seen that the golf ball 10 has a core 20, a cover layer 30, dimples 40, and a coating layer 35. The cover layer 30, core 20 and coating layer 35 may each comprise multiple layers.

Figure 3:
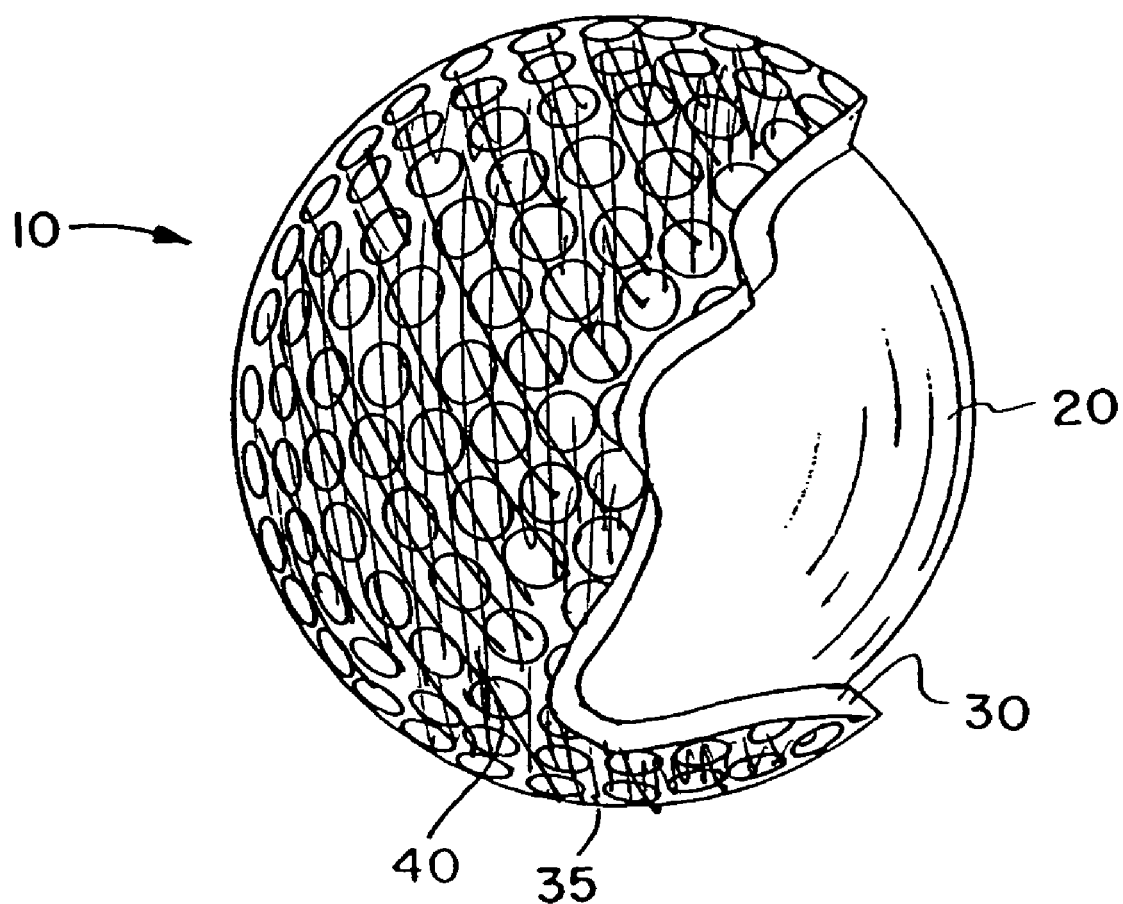
FIG. 3 shows the golf ball of FIG. 1 with a coating comprising a leuco dye.

FIG. 3 shows the golf ball of FIG. 1 wherein the coating 35 has changed to a color. In one embodiment, this would indicate that ball is not in condition for play.

The golf ball of the invention preferably comprises a cover layer disposed about the core. The cover may be a single cover layer or optionally a multi-layer cover. The cover layer is constructed from any suitable cover material known in the golf ball art. Furthermore, the mantle layers may contain a plurality of protuberances. Suitable cover materials are more fully described herein.

Additionally, it is contemplated that golf balls employing a core according to the present invention may have one or more core layers disposed thereon and one or more mantle layers disposed between the core and the cover layer or layers. Suitable mantle layer materials are more fully described herein.

Preferred cover materials are natural and synthetic balata, various ionomers and non-ionomers, such as polyurethanes, and blends thereof. Ionomer covers and some non-ionomer covers are very durable and result in what is referred to as "cut proof" golf balls.

The cover and mantle layers of golf balls according to the present invention may comprise any material suitable for use as a golf ball mantle. Examples of preferred materials include, but are not limited to, ionomer resins, non-ionomer resins such as nylon compositions, thermoplastics compositions, thermoset compositions, and polyurethane materials.

With respect to a preferred ionomeric cover or mantle layer composition of the invention, ionomeric resins are polymers containing interchain ionic bonding. As a result of their toughness, durability, and flight characteristics, various ionomeric resins sold by E.I. DuPont de Nemours & Company under the trademark SURLYN®, and by the Exxon Corporation (see U.S. Pat. No. 4,911,451, incorporated herein by reference) under the trademarks ESCOR® and IOTEK®, have become the materials of choice for the construction of golf ball layers over the traditional "balata" (transpolyisoprene, natural or synthetic) rubbers.

The cover layer(s) can also be formed from a number of other non-ionomeric thermoplastics and thermosets. For example, lower cost polyolefins and thermoplastic elastomers can be used. Non-limiting examples of suitable non-ionomeric polyolefin materials include low density polyethylene, linear low density polyethylene, high density polyethylene, polypropylene, rubber-toughened olefin polymers, acid copolymers which do not become part of an ionomeric copolymer when used in the inner cover layer, such as PRIMACOR®, NUCREL®, ESCOR® and ATX, plastomers and flexomers, thermoplastic elastomers such as styrene/butadiene/styrene (SBS) or styrene/ethylene-butylene/styrene (SEBS) block copolymers, including KRATON® (Shell), dynamically vulcanized elastomers such as SANTOPRENE® (Monsanto), ethylene vinyl acetates such as ELVAX® (DuPont), ethylene methyl acrylates such as OPTEMA® (Exxon), polyvinyl chloride resins, and other elastomeric materials may be used. Mixtures, blends, or alloys involving the materials described above can be used. The cover layer(s) optionally may include processing aids, release agents and/or diluents.

The core and any core layers according to the present invention may be formed from any suitable core material known in the golf ball art. The core may be formed from a natural or synthetic rubber such as polybutadiene or polyisoprene, a thermoset material, a thermoplastic material, or combinations thereof.

The cores generally have a weight of about 25 to 40 grams and preferably about 30 to 40 grams and can be molded from a variety of materials. As an example, the core can be molded from a slug of uncured or lightly cured elastomer composition comprising a high cis content polybutadiene and a metal salt of an ethylenically unsaturated carboxylic acid such as zinc mono- or diacrylate or methacrylate. To achieve higher coefficients of restitution and/or to increase hardness in the core, the amount of zinc diacrylate co-agent may be increased. In addition, larger amounts of metal oxide such as zinc oxide may be included in order to increase the core weight so that the finished ball more closely approaches the U.S.G.A. upper weight limit of 1.620 ounces. Non-limiting examples of other materials which may be used in the core composition include compatible rubbers or ionomers, and low molecular weight fatty acids such as stearic acid. Free radical initiator catalysts such as peroxides are mixed with the core composition so that on the application of heat and pressure, a curing or cross-linking reaction takes place.

Materials suitable for a mantle layer include any of those previously listed as materials suitable for a cover layer, as well as those suitable for a core or core layer.

Energy transfer within a golf ball is a function of the thickness of the respective layers, the size, shape and the materials used to form the respective layers. Physical properties of a golf ball of the present invention may be adjusted and optimized by varying the compositions and thickness of individual layers and also by variations in the surface topography of one or more mantle layers. A golf ball functions by the flexing of the respective core and cover layers when the golf ball is struck with a golf club. As a result of the flexing, kinetic energy is transferred from a moving golf club head to the golf ball, causing the golf ball to be propelled a great distance.

The ability of a golf ball to transfer energy from a moving golf club head to itself is controlled by the modulus of elasticity of the materials, which are generally polymers, that make up the various components of a golf ball. The modulus of elasticity of a polymer varies with temperature. Generally, the higher the temperature within a given range, the higher the modulus of elasticity. In view of this, it is therefore desirable that a golf ball be played under optimum temperature conditions. This invention provides a qualitative indication of the golf ball temperature, thereby allowing a golfer to determine when a golf ball is at the optimum temperature for play. The golf balls of the present invention incorporate in one or more coating layers a leuco dye or leuco dye system. As the temperature of the golf ball changes, the leuco dye changes color or becomes translucent or transparent. In one embodiment, the leuco dye changes to a visible color, indicating the ball is not suitable for play, and in another embodiment, the leuco dye may become transparent when it is not suitable for play. This change in color is useful to indicate when the golf ball is at the optimum temperature for play. One or more additional indicia may be used in combination with the indication in the coating layer. For example, the ball may have a stamp with a logo or a word indicating that it is fit for use, or some other indicia, in addition to the color changing coating layer.

In the manufacture of golf balls, one of the last steps in the manufacturing process is generally a painting or finishing step. In some instances, a semi finished ball is printed and clear coated. In many cases, the semi finished golf ball is primed, painted if necessary, printed and clear coated. Many covers do not need to be painted if pigments and optical brighteners are utilized. See, for example, U.S. Pat. No. 4,679,795 to Melvin et al., incorporated by reference herein. In one embodiment of this invention, the leuco dye is incorporated into a primer coat. In another embodiment, the leuco dye is incorporated into the topcoat. The leuco dye may also be incorporated into two or more layers, such as in a primer layer and a topcoat layer or two or more topcoat layers.

Leuco dye systems measure temperature change less precisely than other thermochromic compounds, such as cholesteric liquid crystals. When a leuco dye system is utilized as a thermochromic compound, the temperature response of the indicia on the golf ball is less precise. However, the leuco dye system is much more solvent resistant and less ultraviolet sensitive, and therefore it is preferred for use in coatings for golf balls.

Thermochromic leuco dye systems are also referred to as "white dyes". They are named such due to the colorless state that they are in under certain conditions (i.e. pH, temperature, UV radiation). These leuco dye systems are typically used in a microencapsulated multi component mixture. Generally, the first component of the leuco dye system is a spirolactone such as fluorans or crystal violet lactone, spiropyrans or fulgides.

The second component is generally a color developer. The color developer is often referred to as an "electron acceptor", but it is more accurately described as a proton donor that can affect the equilibrium of the dye system. The color developer is typically a weak acid. Examples that may be suitable for use in the present invention include, but are not limited to, bisphenol A, 1,2,3 triazoles (such as 1,2,3-benzotriazole and 1,2,3-triazole ethyl 4-methyl-5-carboxylate), octyl phydroxybenzoate and 4-hydroxycoumarin derivatives.

The third component of the leuco dye system is generally a polar solvent. Examples of polar solvents include, but are not limited to, lauryl alcohol, cetyl alcohol and butyl stearate. The polar solvent is an important component since it is the melting point of this component that controls the temperature at which the color change will take place.

These microencapsulated materials are typically colored at low temperatures (below the melting point of the solvent) and colorless at higher temperatures.

An example of a leuco dye system is one that generally contains the following components:
  1. leuco dye (such as crystal violet lactone);
  2. weak acid (such as 1,2,3-benzotriazole);
  3. solvent (such as lauryl alcohol); and optionally
  4. salt (such as myristylammonium oleate).

The salt dissociates at high temperature into amine and carboxylic acids, and this dissociation raises the pH of the system and causes the dye to take up its colorless closed-ring form.

In the microencapsulated state, these leuco dye systems are the preferred embodiment for use in this invention.

EXAMPLE

The present invention will be described in greater detail with reference to the following Example. All formulations listed in the Example are parts by weight unless otherwise specified.

A blue leuco dye system was incorporated into a standard topcoat formulation. The topcoat formulation was a solvent based, aliphatic polyester urethane system, and 0.5% by weight of a blue leuco dye (Powder Blue 31 CT) was added to the coating. The leuco dye powders are commercially available from Color Change Corporation, Addison, Ill. Standard golf balls were coated with the topcoat using standard manufacturing techniques (spraying) and allowed to dry. The golf balls were then exposed to higher temperatures. The topcoat of the golf balls of the invention changed from blue to clear when exposed to temperatures in the range of 70 to 100° F. with an average of 88° F. Other leuco dye systems can also be used, depending on the desired temperature range. For example, there are leuco dye systems that can change from a color to a clear (or invisible) at temperatures as low as about 23° F. or that do not change until they reach a temperature of about 140° F. Therefore, depending on the desired application, location, and the like, the appropriate leuco dye can be selected. Although a blue leuco dye was used in this example, any desired color or combination of colors can be used. Two or more dyes that change color at different temperatures could be used to indicate various ranges of temperature.

Although the formulation is proprietary, Applicant believes that the leuco dye powder was a microencapsulated, multi component material containing at least a dye, a color developer and a solvent. Applicant speculates that the leuco dye powder may also contain a salt that dissociates at high temperature, changing the pH of the system.

The foregoing description is considered to describe the preferred embodiments of the present invention. However, it is contemplated that various changes and modifications apparent to those skilled in the art may be made without departing from the present invention. Therefore, the foregoing description is intended to cover all such changes and modifications encompassed within the spirit and scope of the present invention, including all equivalents.

The invention claimed is:

1. A golf ball comprising:
   a core;
   a cover disposed on the core, the cover composed of a material selected from the group consisting of ionomers, polyurethane and blends thereof, the cover having a surface; and,
   a primer coat disposed on the surface of the cover, the primer coat comprising a leuco dye system, the leuco dye system capable of indicating whether the golf ball is above or below a predetermined temperature, the leuco dye system comprising a spirolactone component, a color developer component, a polar solvent component and a salt component.

2. The golf ball of claim 1, wherein the cover comprises at least one inner cover layer and at least one outer cover layer.

3. The golf ball of claim 1, further comprising a temperature indicating mark printed on the cover.

4. The golf ball of claim 1, wherein the core comprises at least an inner core and a core layer surrounding the inner core.

5. A golf ball comprising:
   a core;
   a cover disposed on the core, the cover composed of a material selected from the group consisting of ionomers, polyurethane and blends thereof, the cover having a surface; and,
   a coating layer disposed on the surface of the cover, the coating layer comprising a leuco dye system, the leuco dye system capable of indicating whether the golf ball is above or below a predetermined temperature, the leuco dye system comprising
      a spirolactone component selected from the group consisting of fluorans, crystal violet lactone, spiropyrans and fulgides,
      a color developer component selected from the group consisting of bisphenol A, 1,2,3 triazoles, octyl phydroxybenzoate and 4-hydroxycoumarin derivatives,
      a polar solvent component selected from the group consisting of lauryl alcohol, cetyl alcohol and butyl stearate, and
      a salt component.

* * * * *